(12) United States Patent
Kudo et al.

(10) Patent No.: US 7,724,944 B2
(45) Date of Patent: May 25, 2010

(54) IMAGE RETRIEVAL METHOD AND IMAGE RETRIEVAL DEVICE

(75) Inventors: Daiki Kudo, Tokyo (JP); Hirofumi Nishikawa, Tokyo (JP); Yoshiaki Kato, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 849 days.

(21) Appl. No.: 11/597,612

(22) PCT Filed: Aug. 19, 2004

(86) PCT No.: PCT/JP2004/011922

§ 371 (c)(1),
(2), (4) Date: Nov. 27, 2006

(87) PCT Pub. No.: WO2006/018886

PCT Pub. Date: Feb. 23, 2006

(65) Prior Publication Data

US 2007/0223811 A1    Sep. 27, 2007

(51) Int. Cl.
*G06K 9/00* (2006.01)
*G06K 9/46* (2006.01)
*G06K 9/62* (2006.01)

(52) U.S. Cl. .................. 382/162; 382/164; 382/165; 382/203; 382/190; 382/209

(58) Field of Classification Search .................. 382/162, 382/164, 165, 173, 180, 190, 209, 218, 203
See application file for complete search history.

(56) References Cited

FOREIGN PATENT DOCUMENTS

| JP | 7-95385 A | 4/1995 |
|---|---|---|
| JP | 11-167634 A | 6/1999 |
| JP | 2000-207420 A | 7/2000 |
| JP | 2001-273493 A | 10/2001 |
| JP | 2002-133412 A | 5/2002 |
| JP | 2003-323602 A | 11/2003 |
| JP | 2004-21430 A | 1/2004 |
| JP | 2004-192121 A | 7/2004 |
| JP | 2004-361987 A | 12/2004 |

OTHER PUBLICATIONS

Yamada, Eizo Joho Media Gakkaisha, vol. 55, No. 11, The Institute of Image Information and Television Engineers, Nov. 1, 2001, pp. 1391-1393.

*Primary Examiner*—John B Strege
(74) *Attorney, Agent, or Firm*—Birch, Stewart, Kolasch & Birch, LLP (57) ABSTRACT

Each of an image retrieval method and an image retrieval device in accordance with the present invention is provided with a means for extracting a color layout feature quantity, a dominant color feature quantity, a region division feature quantity, and a shape feature quantity from a query image which is a key of retrieval, and a means for specifying a region of interest of the image by carrying out mutual use of the above-mentioned feature quantities.

15 Claims, 7 Drawing Sheets

IMAGE RETRIEVAL METHOD AND IMAGE RETRIEVAL DEVICE

FIELD OF THE INVENTION

The present invention relates to an image retrieval method of and an image retrieval device for finding out an image specified by a user and an image similar to the specified image from images to be retrieved.

BACKGROUND OF THE INVENTION

Conventionally, when retrieving an image, a keyword related to the image is generally used. As a means for retrieving an image which is intuitively similar to a query image which is used as a key of retrieval, there has been provided a method of extracting feature quantities, such as the color, texture, and outline of the query image, from the query image, and retrieving an image on the basis of the feature quantities. Furthermore, there has been proposed a method of dividing the query image into regions, extracting image characteristic quantities from each of the regions, and calculating degrees of similarity between the query image and images to be retrieved.

In general, a portion including an object to be shot and a background portion exist in a captured image. In a case in which feature quantities are extracted from the whole image, the feature quantities of the object to be shot and the feature quantities of the background coexist in the extracted feature quantities. Therefore, especially in a case in which the background portion occupies a large region in the image, the feature quantities of the background become a factor to lower the retrieval accuracy remarkably.

In order to solve this problem, patent reference 1 proposes a method of dividing an image into some regions, extracting feature quantities, and carrying out similarity calculation.

[Patent reference 1] JP,2004-21430,A

However, in accordance with the method disclosed in patent reference 1, an image is divided into rectangular regions, and no method of specifying the region of the object to be shot is disclosed explicitly. Many kinds of feature quantities, such as color, shape, and texture, are extracted from the image, and show different features of the image. Because feature quantities which should be thought as important in the calculation of similarity vary dependently upon images to be retrieved and the user's taste, desired results are hard to be obtained. A further problem is that in a case in which the number of images to be referred to is huge and the similarity calculation is carried out for each of all of many feature quantities, large amounts of computations are needed, the cost of the retrieval system is increased, and the user's convenience may be spoiled.

The present invention is made in order to solve the above-mentioned problems, and it is therefore an object of the present invention to provide an image retrieval method and an image retrieval apparatus which achieve improvement in the speed of extraction of feature quantities and similarity calculation by making mutual use of the feature quantities, and which improve the retrieval accuracy and speed by carrying out region division adaptively and selecting an appropriate feature quantity.

DISCLOSURE OF THE INVENTION

Each of an image retrieval method and an image retrieval device in accordance with the present invention is provided with a means for extracting a color layout feature quantity, a dominant color feature quantity, a region division feature quantity, and a shape feature quantity from a query image which is a key of retrieval, and a means for specifying a region of interest of the image by carrying out mutual use of the above-mentioned feature quantities.

The image retrieval method and image retrieval device in accordance with the present invention have an advantage of being able to carry out extraction of feature quantities of an image and similarity calculation at a high speed, and to carry out an appropriate division of the image into regions and selection of a feature quantity, thereby improving the retrieval accuracy.

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
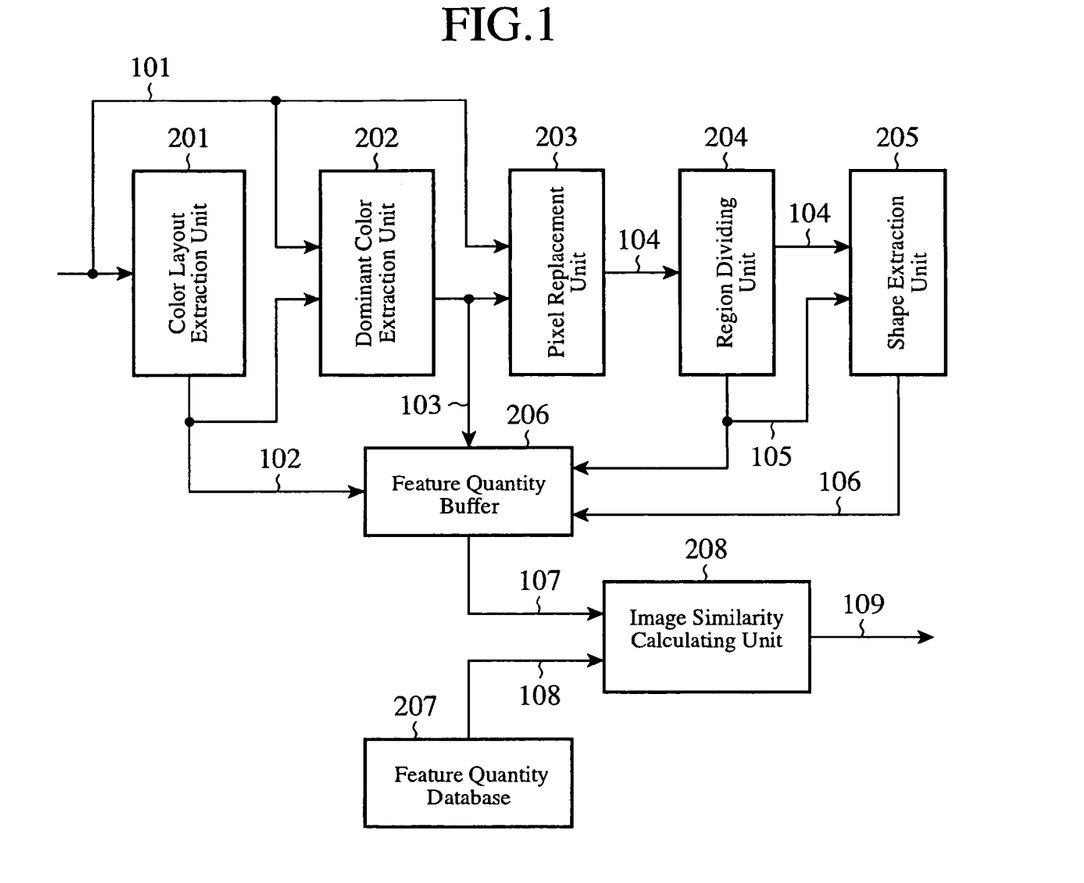
FIG. 1 is a block diagram showing an image retrieval method in accordance with embodiment 1 of the present invention.

FIG. 1 is a block diagram showing an image retrieval method in accordance with embodiment 1 of the present invention.

This image retrieval method includes a color layout extraction unit 201 for dividing an inputted query image which is used as an key of retrieval and which is referred to as the query image 101 into blocks, for calculating an average color for each block, and for extracting a feature quantity about layout of colors, which is referred to as the color layout feature quantity 102, a dominant color extraction unit 202 for calculating a dominant color of the image and for extracting a feature quantity showing the dominant color of the image, which is referred to as the dominant color feature quantity 103, a pixel replacement unit 203 for creating an image in which the color of each pixel is replaced by the above-mentioned dominant color in the query image 101, the image being referred to as the replacement image 104, a region dividing unit 204 for estimating a region of interest which is a region in the image which attracts interest from the user, and a region of no interest which is a region which attracts no interest from the user from the replacement image 104, and for extracting a feature quantity indicating the divided regions, which is referred to as the region division feature quantity 105, a shape extraction unit 205 for calculating the shape of each object in the image and for extracting a feature quantity indicating the shape of each object, which is referred to as the shape feature quantity 106, a feature quantity buffer 206 for storing the above-mentioned extracted feature quantities, a feature quantity database 207 which is a database for the feature quantities of a image-to-be-referred-to group, and an image similarity calculating unit 208 for calculating a similarity from the feature quantities of the query image and those of an image to be referred to.

The color layout extraction unit 201 divides a query image 101 inputted thereto into rectangular blocks, calculates an average color for each block, which is referred to as a block average color, and then defines it as a color layout feature quantity 102.

The dominant color extraction unit 202 extracts, as a dominant color feature quantity 103, the dominant color of the image, which is referred to as an image dominant color, from the image using the color layout feature quantity 102 and query image 101. In many cases, clustering is used in order to extract the dominant color from an image. For example, the dominant color extraction unit 202 can extract the dominant color of the image at a high speed by using, as an initial value of the clustering, information on the color layout feature quantity 102. Conventionally, because any information could not be used when extracting the dominant color of an image, there is a problem that it takes much time to carry out computations for extracting the dominant color of the image. The dominant color extraction unit 202 can carry out computations at a high speed at the time of extracting the dominant color of the image by using the above-mentioned block average color.

Figure 2:
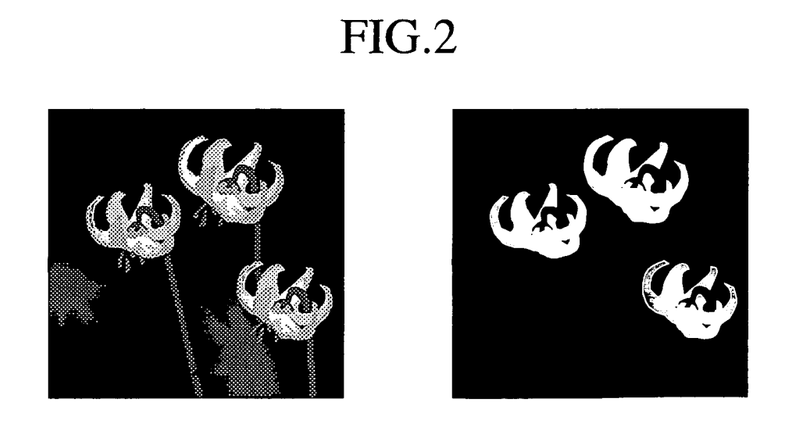
FIG. 2 is a diagram showing a query image and an replacement image which is created on the basis of the query image in the image retrieval method in accordance with embodiment 1 of the present invention.

Furthermore, the pixel replacement unit 203 replaces the color of each pixel of the query image 101 with the image dominant color so as to create a replacement image 104. FIG. 2 is a diagram showing an example in which the pixel replacement unit creates the replacement image from the query image on the basis of the image dominant color of the query image. In this example, the pixel replacement unit creates the replacement image shown in the right side of the figure from the query image shown in the left side of the figure. In FIG. 2, the pixel replacement unit carries out the replacement by defining the image dominant color of the gray-scale image as a binary value showing white or black.

This replacement image 104 is then inputted to the region dividing unit 204. The replacement image 104 is expressed with the number of colors which is far smaller than that of the query image 101, and therefore the region dividing unit can divide the target image into a region of interest and a region of no interest at a higher speed by using the replacement image 104. To be more specific, the region dividing unit uses, for example, a method of setting portions having the dominant color as an object 1, an object 2, . . . , and an object x, and defining an object which exists at the center of the image as the region of interest, or defining an object having a high brightness of the image dominant color as the region of interest. Position information on the position of each of the plurality of regions into which the image is divided, information indicating whether each region is the region of interest or the region of no interest, etc. are included in this region division feature quantity 105.

The shape extraction unit 205 accepts the region division feature quantity 105 and replacement image 104, and carries out extraction of the shape of each object. The shape extraction unit can know the position information on the region of interest and the position information on the region of no interest by using the region division feature quantity 105, as mentioned above. The shape extraction unit can calculate the shape of each object at a higher speed compared with a conventional method of calculating the shape of each object directly from the query image, and can extract a shape feature quantity 106.

The feature quantities (i.e., the color layout feature quantity, dominant color feature quantity, region division feature quantity, and shape feature quantity) 107 extracted by means of the above-mentioned methods are stored in the feature quantity buffer 206. The image similarity calculating unit 208 carries out similarity calculation from the feature quantities 108 of each image to be referred to stored in the feature quantity database 207 so as to calculate an image similarity, and outputs similarity calculation results 109.

As mentioned above, in accordance with this embodiment 1, when extracting an image feature quantity, high-speed retrieval of each feature quantity can be carried out by using another image feature quantity. A feature quantity effective at retrieving an image varies from image to image, and many feature quantities take much time to be subjected to computation of extraction. In accordance with embodiment 1, the dominant color feature quantity is extracted at a high speed using the color layout feature quantity, and the shape feature quantity is extracted at a high speed using the region division feature quantity and replacement image. As a result, because many feature quantities of an image can be extracted in a short time, high-speed and high-precision image retrieval can be carried out.

Embodiment 2

Figure 3:
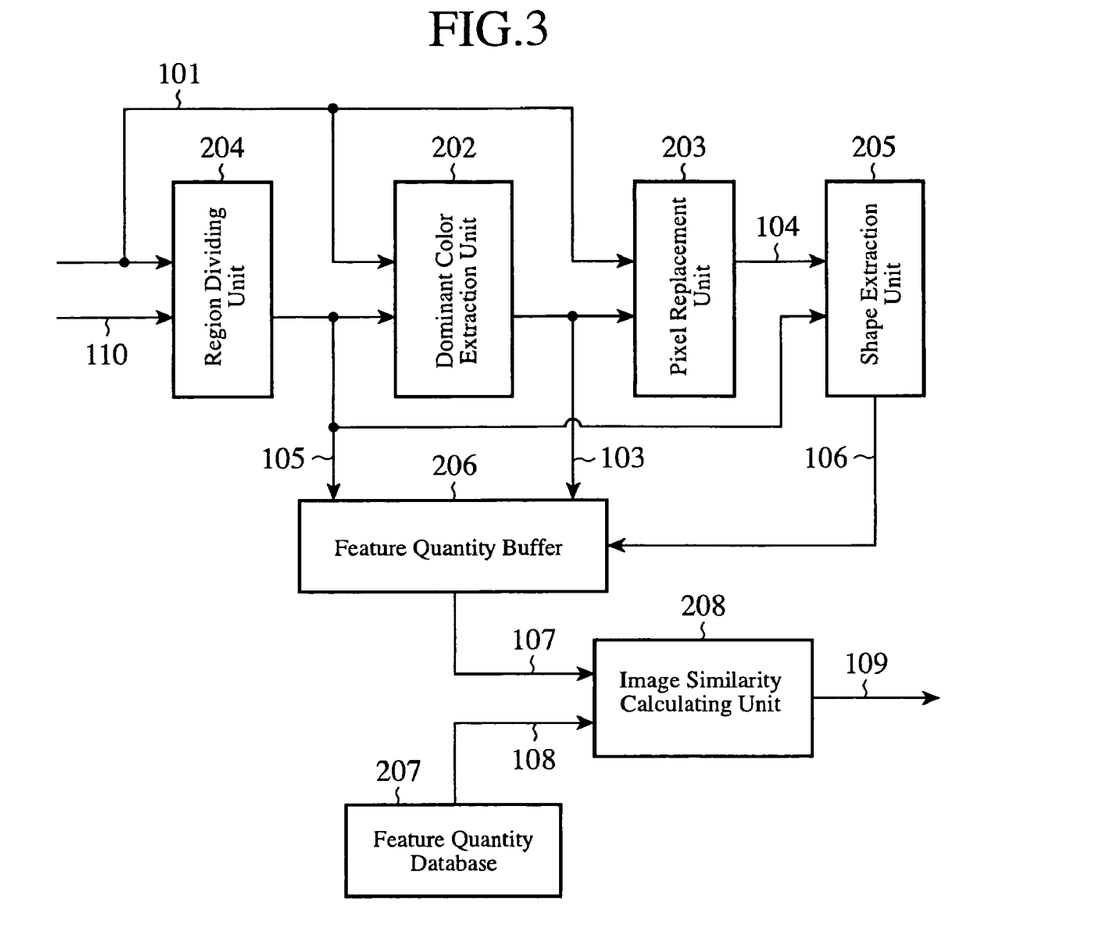
FIG. 3 is a block diagram showing an image retrieval method in accordance with embodiment 2 of the present invention.

FIG. 3 is a block diagram showing an image retrieval method in accordance with embodiment 2 of the present invention.

This image retrieval method includes a region dividing unit 204 for extracting an region division feature quantity 105 from a query image 101, a dominant color extraction unit 202 for extracting a dominant color feature quantity 103 from the region division feature quantity 105 and query image 101, a pixel replacement unit 203 for creating a replacement image 104, a shape extraction unit 205 for extracting a shape feature quantity 106 from the replacement image 104 and region division feature quantity 105, a feature quantity buffer 206 for storing the above-mentioned feature quantities, a feature quantity database 207 which is a database for the feature quantities of a image-to-be-referred-to group, and an image similarity calculating unit 208 for calculating a similarity from the feature quantities of the query image and those of an image to be retrieved.

Figure 4:
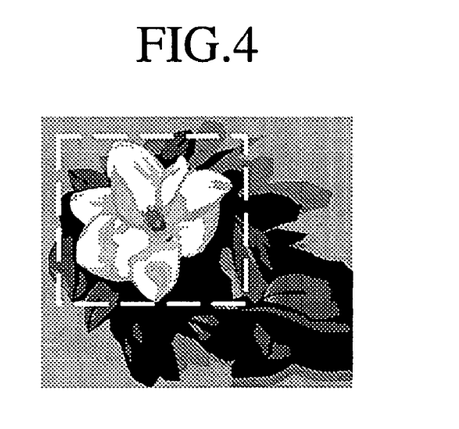
FIG. 4 is a diagram showing easy specification of a region of interest by the user in the image retrieval method in accordance with embodiment 2 of the present invention.

According to the image retrieval method in accordance with embodiment 2, after the user is made to specify a region of interest in the query image 101 first, retrieval similar to that as shown in above-mentioned embodiment 1 is carried out. FIG. 4 is a diagram showing easy specification of a region of interest by the user. The user is allowed to simply specify a region of interest in the image, e.g., an object to be shot which is an object of interest or a portion of interest in the object to be shot (in the example shown in the figure, a flower enclosed by a box) with a rectangle.

The region dividing unit 204 divides the query image 101 into the region of interest and a region of no interest on the basis of this region-of-interest specification information 110 provided by the user so as to extract a region division feature quantity 105. Position information on the position of each of the regions obtained at the time of dividing the image into the regions, information indicating that each of the regions is the region of interest or the region of no interest, etc. are included in this region division feature quantity 105.

The dominant color extraction unit 202 extracts the dominant color 103 of the query image 101, i.e., a dominant color feature quantity, from the region division feature quantity 105 and query image 101. In this case, the dominant color extraction unit performs high-precision dominant color extraction on the region specified by the user, i.e., the region of interest, while the dominant color extraction unit performs image dominant color extraction, which places prime importance on speed, on the other region which is not specified by the user, i.e., the region of no interest. Therefore, as compared with a case in which high-precision image dominant color extraction is performed on all the regions, the dominant color extraction unit can perform extraction of the image dominant color while doing it at a high speed without decreasing the accuracy at the time of the similarity calculation.

The pixel replacement unit 203 replaces each pixel of the query image 101 with a pixel of the image dominant color so as to create a replacement image 104.

The shape extraction unit 205 extracts a shape feature quantity 106 using this replacement image 104 and region division feature quantity 105. The shape extraction unit can carry out a high-speed calculation of the shape of each object and high-speed extraction of the shape feature quantity 106 by using the region division feature quantity 105, like that of embodiment 1.

The feature quantities 107 extracted by means of the above-mentioned methods are stored in the feature quantity buffer 206. The image similarity calculating unit 208 carries out similarity calculation from the feature quantities 108 of each image to be referred to stored in the feature quantity database 207 so as to calculate an image similarity, and outputs the similarity calculation results 109.

As mentioned above, in accordance with this embodiment 2, when extracting an image feature quantity, high-speed retrieval with each feature quantity can be carried out by using another image feature quantity. Furthermore, by only allowing the user to specify a region of interest in the query image very simply, the dominant color feature quantity can be extracted from the query image using the region-of-interest specification information at a high speed and with a high degree of precision. In addition, the shape feature quantity can be extracted from the replacement image using the region division feature quantity at a high speed. As a result, because many feature quantities of an image can be extracted in a short time, high-speed and high-precision image retrieval can be carried out.

Embodiment 3

Figure 5:
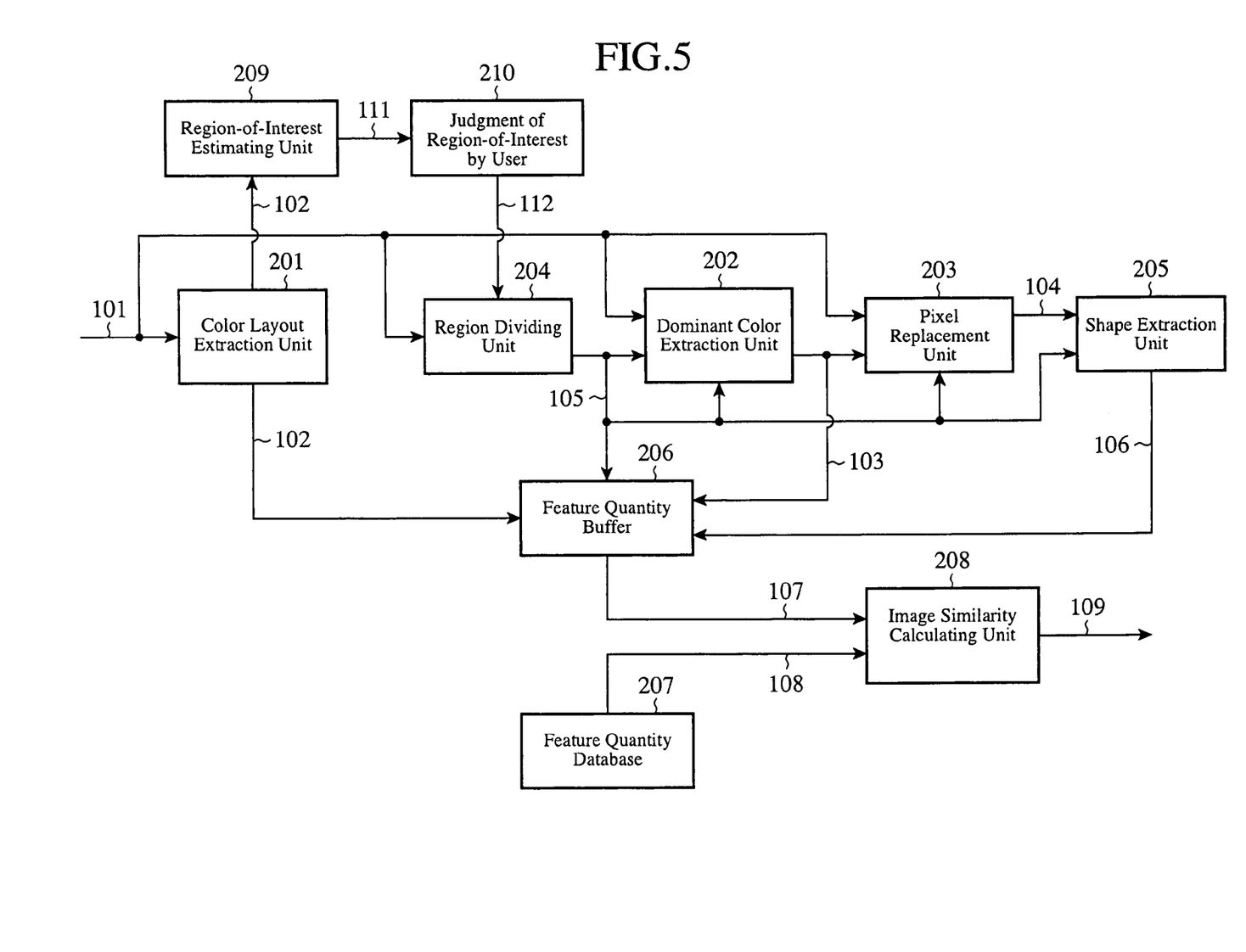
FIG. 5 is a block diagram showing an image retrieval method in accordance with embodiment 3 of the present invention.

FIG. 5 is a block diagram showing an image retrieval method in accordance with embodiment 3 of the present invention.

This image retrieval method includes a color layout extraction unit 201 for extracting a color layout feature quantity 102 from an inputted query image 101, a region-of-interest estimating unit 209 for estimating a region of interest of the query image 101 from the color layout feature quantity 102, a region-of-interest judgment unit 210 for causing the user to judge the region of interest, a region dividing unit 204 for extracting a region division feature quantity 105 from the query image 101, a dominant color extraction unit 202 for extracting a dominant color feature quantity 103 from the query image 101, a pixel replacement unit 203 for creating a replacement image 104, a shape extraction unit 205 for extracting a shape feature quantity 106 from the replacement image 104, a feature quantity buffer 206 for storing the above-mentioned feature quantities, a feature quantity database 207 which is a database of the feature quantities of a image-to-be-referred-to group, and an image similarity calculating unit 208 for calculating a similarity from the feature quantities of the query image and those of an image to be referred to.

The color layout extraction unit 201 divides a query image 101 inputted thereto into rectangular blocks, calculates a block average color, and then defines it as a color layout feature quantity 102.

Figure 6:
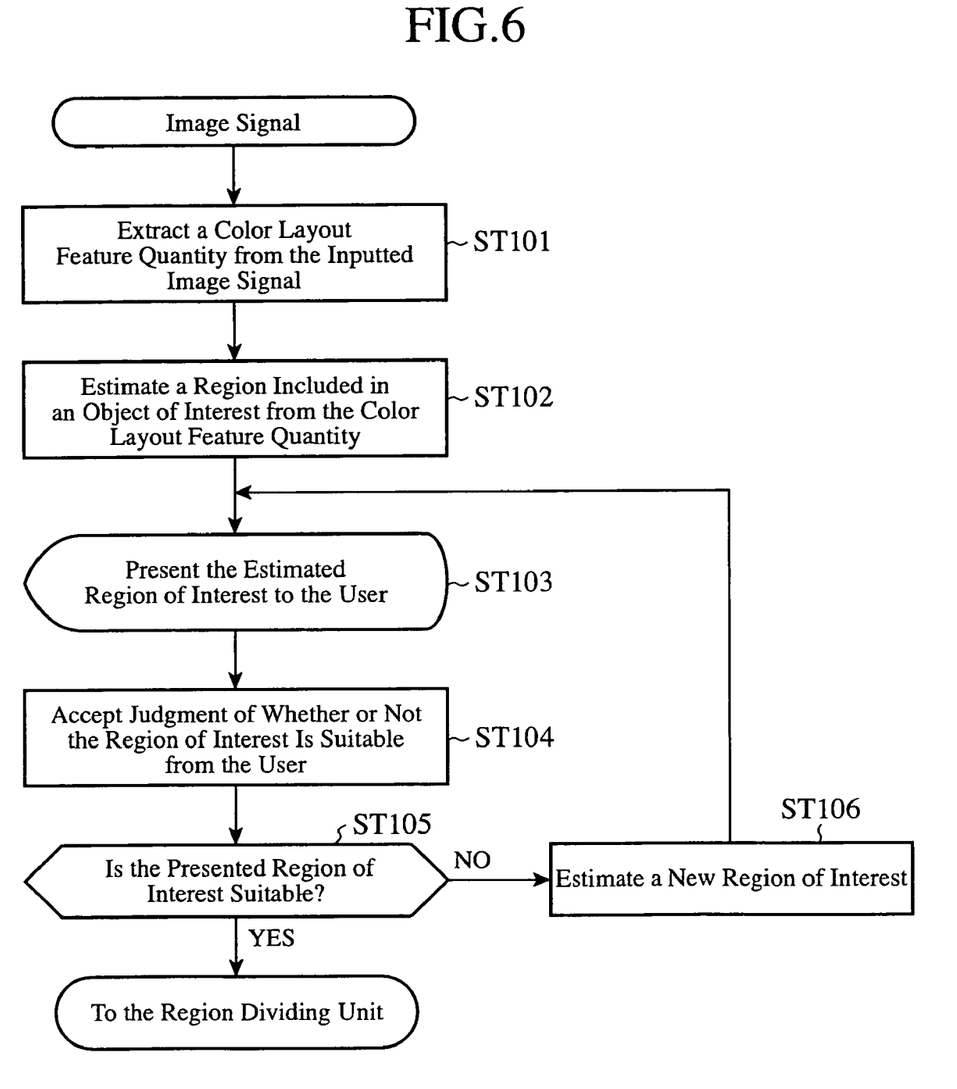
FIG. 6 is a diagram showing specification of a region of interest by the user in the image retrieval method in accordance with embodiment 3 of the present invention.

This color layout feature quantity 102 is inputted to the region-of-interest estimating unit 209. A flow chart of a process carried out by the color layout extraction unit 201, a process carried out by the region-of-interest estimating unit 209, and a process of causing the user to judge the region of interest which is carried out by the region-of-interest judgment unit 210 is shown in FIG. 6. P The color layout extraction unit 201, in step ST101, extracts a color layout feature quantity 102 from an inputted image signal of query image 101 first. Next, the region-of-interest estimating unit 209, in step ST102, estimates a region in which an object of interest is included, i.e., a region of interest from the color layout feature quantity 102. The region-of-interest estimating unit then, in step ST103, presents the region of interest estimated in ST102 to the user. Hereafter, the information presented to the user is referred to as the region-of-interest estimation information 111. Next, the region-of-interest judgment unit 210, in step ST104, causes the user to judge whether or not the region of interest presented to the user is suitable, and, when the user judges that it is suitable, shifts the sequence to the process by the region dividing unit 204. In contrast, when the user judges that the region of interest is not suitable, the apparatus advances to step ST106. In step ST106, the region-of-interest judgment unit presents a second candidate for the region of interest to the user. As an alternative, the region-of-interest estimating unit 209 changes the extraction parameters and the algorithm, estimates the region of interest again, and then repeats the estimation and presentation of the region of interest until the user judges that the presented region of interest is suitable. As examples of a concrete estimation method of estimating the region of interest using the color layout feature quantity, there can be provided a method of estimating a portion having high brightness of the color layout as the region of interest, and a method of estimating a portion having a color which is close to the color at the center of the color layout as the region of interest.

The region dividing unit 204 divides the query image 101 into the region of interest and a region of no interest on the basis of the region-of-interest judgment result 112 which is acquired by the region-of-interest judgment unit 210 from the judgment by the user so as to extract a region division feature quantity 105. Position information on the position of each of the regions acquired at the time of dividing the image into the regions, information indicating that each of the regions is the region of interest or the region of no interest, etc. are included in this region division feature quantity 105.

Next, the dominant color extraction unit 202 extracts the dominant color of the query image 101, i.e., a dominant color feature quantity 103, from the region division feature quantity 105 and query image 101. In this case, the dominant color extraction unit performs high-precision dominant color extraction on the region specified by the user, i.e., the region of interest, whereas the dominant color extraction unit performs image dominant color extraction, which places prime importance on speed, on the other region which is not specified by the user, i.e., the region of no interest, like that of embodiment 2. Therefore, as compared with a case in which high-precision image dominant color extraction is performed on all the regions, the dominant color extraction unit can perform extraction of the image dominant color while doing it at a high speed without decreasing the accuracy at the time of the similarity calculation.

Furthermore, the pixel replacement unit 203 creates a replacement image 104 from the query image 101 and dominant color feature quantity 103.

The shape extraction unit 205 then extracts a shape feature quantity 106 using the replacement image 104 and region division feature quantity 105. The shape extraction unit can carry out a high-speed calculation of the shape of each object and high-speed extraction of the shape feature quantity 106 by using the region division feature quantity 105, like those of embodiments 1 and 2.

The feature quantities 107 extracted by means of the above-mentioned methods are stored in the feature quantity buffer 206. The image similarity calculating unit 208 carries out similarity calculation from the feature quantities 108 of each image to be referred to stored in the feature quantity database 207 so as to calculate an image similarity, and outputs the similarity calculation results 109.

As mentioned above, in accordance with this embodiment 3, the dominant color feature quantity can be extracted from the query image through automatic estimation of the region of interest and judgment of the region of interest by the user with a high degree of precision and at a high speed. In addition, the shape feature quantity can be extracted from the replacement image using the region division feature quantity at a high speed. As a result, because many feature quantities of an image can be extracted in a short time, high-speed and high-precision image retrieval can be carried out while the load of performing input operations on the user can be reduced.

Embodiment 4

Figure 7:
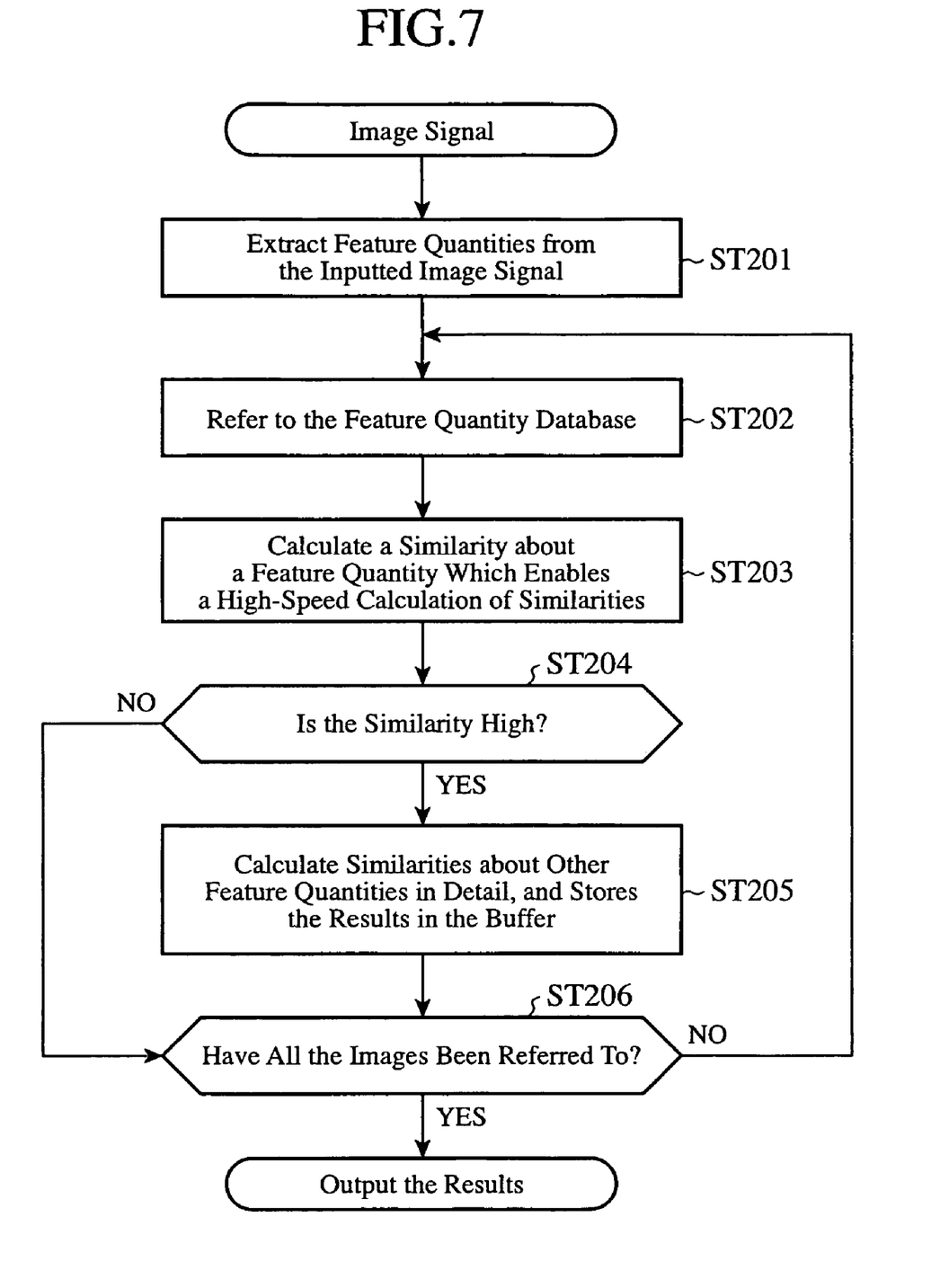
FIG. 7 is a flow chart showing an image retrieval method in accordance with embodiment 4 of the present invention.

FIG. 7 is a flow chart showing an image retrieval method in accordance with embodiment 4 of the present invention. In this flow chart, processes carried out in ST202 and subsequent steps represent the calculation method which the image similarity calculating unit 208 in accordance with any of embodiments 1 to 3 uses.

First, in step ST201, above-mentioned various feature quantities are extracted from an image signal of an inputted query image 101. Then in step ST202, the feature quantity database 207 is accessed, the feature quantities of an image to be referred to are retrieved, and a similarity calculation is performed on them by the image similarity calculating unit 208. This similarity calculation result 109 is stored in the feature quantity buffer 206. In step ST203, only a feature quantity of the image to be referred to which enables a high-speed similarity calculation, for example, a feature quantity having a relatively-small amount of data is retrieved from the feature quantity database 207, and a similarity calculation is performed on the retrieved feature quantity. Next, in step ST204, it is determined whether or not the similarity calculated in ST203 is equal to or higher than a threshold. When it is determined that the similarity is equal to or higher than the threshold, the method advances to ST205. Otherwise, the method advances to ST206. In step ST205, about the image to be referred to which is determined that the similarity based on the part of the feature quantities is equal to or higher than the threshold, similarity calculations are also performed on the basis of the other feature quantities, and the calculation results are then stored in the feature quantity buffer 206. In step ST206, if the similarities of all the images to be referred to have been referred to, the similarity calculation results 109 stored in the feature quantity buffer 206 are outputted. In contrast, unless all the images have been referred to yet, the method returns to step ST202.

As mentioned above, in accordance with this embodiment 4, even when the feature quantity database has an enormous volume of feature quantities to be referred to, the images to be referred to can be narrowed down only with a part of the feature quantities, and, after that, a similarity calculation can be carried out only about the narrowed-down images to be retrieved with the remaining feature quantities. As a result, because the feature quantities which should be used for the similarity calculation can be reduced, high-speed image retrieval can be carried out.

Embodiment 5

Figure 8:
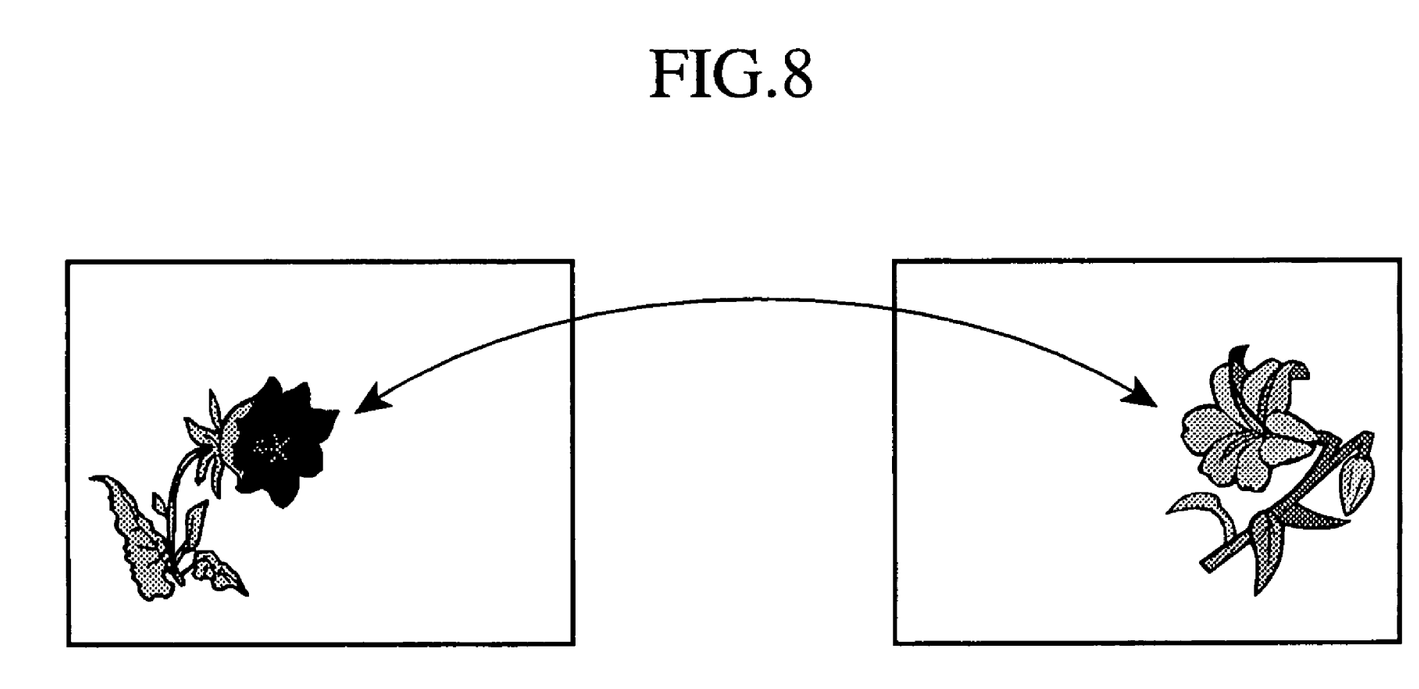
FIG. 8 is a diagram explaining a calculation method of a similarity calculating unit in accordance with embodiment 5 of the present invention.

FIG. 8 explains the calculation method which the image similarity calculating unit 208 in accordance with any of above-mentioned embodiments 1 to 3 uses. The figure at the top shows the query image, and the figure at the bottom shows an image to be referred to.

Conventionally, a similarity between a feature quantity of each block which is acquired by dividing the query image into a plurality of rectangular areas, and either a feature quantity of a block placed at a corresponding position of the image to be referred to or a feature quantity of a block adjacent to the corresponding block is calculated. Therefore, when the position of the region of interest of the query image differs remarkably from that of the image to be referred to, it is difficult to carry out high-precision retrieval.

In this embodiment 5, automatic extraction with the replacement image 104 (refer to embodiment 1), region-of-interest specification information 110 provided by the user (refer to embodiment 2), or region-of-interest judgment result 112 showing a result of judgment of an estimated region of interest by the user (refer to embodiment 3) makes it possible to carry out calculation of a similarity between feature quantities of extracted regions of interest (e.g., objects to be shot) or between feature quantities of extracted regions of no interest (e.g., backgrounds), as shown in FIG. 8.

As mentioned above, in accordance with the embodiment 5, even when the positions of the regions of interest of the query image and an image to be referred to differ from each other, the process of directly calculating a similarity between feature quantities of the regions of interest can implement high-precision image retrieval.

Embodiment 6

Figure 9:
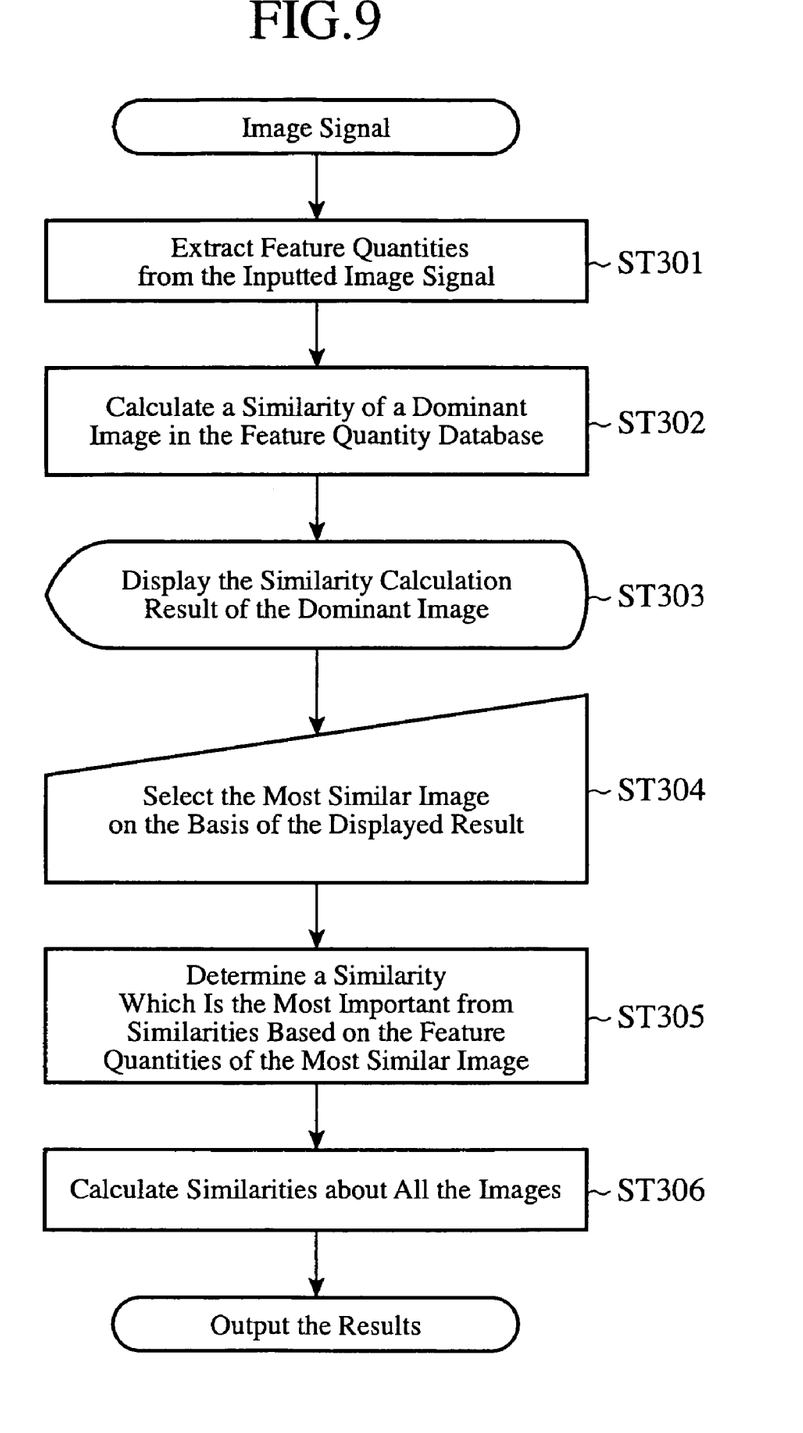
FIG. 9 is a flow chart showing an image retrieval method in accordance with embodiment 6 of the present invention.

FIG. 9 is a flow chart showing an image retrieval method in accordance with embodiment 6 of the present invention. In this flow chart, processes carried out in ST302 and subsequent steps represent the calculation method which the image similarity calculating unit 208 in accordance with any of embodiments 1 to 3 uses.

First, in step ST301, above-mentioned various feature quantities are extracted from an image signal of an inputted query image 101. Next, in step ST302, a similarity between each feature quantity of each image which represents images stored in the feature quantity database 207, which is referred to as each dominant image from here on, and a corresponding feature quantity of the query image 101 is calculated by the image similarity calculating unit 208. The representation image is registered into the feature quantity database 207 in advance. When various images stored in the feature quantity database 207 are grouped into a plurality of groups, an image which represents each of the groups can be selected as each dominant image. Next, in step ST303, the similarity calculation result 109 obtained in ST302 is outputted. Then, in step ST304, a representation image which is assumed to be most similar to the query image is selected by the user on the basis of the outputted calculation results 109 of the similarities between the representation images and the query image. Next, in step ST305, an important feature quantity, i.e., a feature quantity which is assumed to be the most important by the user, is estimated from the similarities based on all the feature quantities between the dominant image selected in ST304 and the query image, and weights are set for all the feature quantities. For example, a method of setting weights which increase in increasing order of similarity for the feature quantities can be provided. Next, in step ST306, calculation of similarities between each of the feature quantities of each of all the images to be referred to and that of the query image is carried out, and a total similarity is then calculated from the similarities based on all the feature quantities using the weights set in ST305.

As mentioned above, in accordance with this embodiment 6, dominant images are selected from the feature quantity database and the user is allowed to perform a simple input operation, i.e., selection of a dominant image which is most similar to the query image so that a retrieval result which the user desires can be acquired from an enormous volume of images. In other words, higher-precision image retrieval can be carried out.

In embodiments 1 to 6, both the images to be referred to and their feature quantities are stored in the image-feature-quantity database. As an alternative, another database for storing only the images to be referred to can be provided independently, and only the feature quantities of the images to be referred can be stored in the image-feature-quantity database while the above-mentioned images to be referred to are associated with the feature quantities, respectively. In this variant, there can be provided a method of, after referring to the image-feature-quantity database on the basis of the similarity calculation results, referring to the image-to-be-retrieved database according to the association.

INDUSTRIAL APPLICABILITY

As mentioned above, the image retrieval method in accordance with the present invention is suitable for an image retrieval apparatus which effectively retrieves a similar image on the basis of an image, such as a photograph, which consists of a portion including an object to be shot and a background portion.

The invention claimed is:

1. An image retrieval method for retrieving an image which is similar to a query image which is a search key from a group of images to be referred to which is a target for retrieval, said method comprising the steps of:

dividing said query image into blocks and extracting a color layout feature quantity showing an average color of each block;

extracting a dominant color feature quantity showing a dominant color from said query image using said color layout feature quantity;

creating a replacement image in which each pixel of said query image is replaced by a pixel of the dominant color shown by said dominant color feature quantity;

dividing said replacement image into a region of interest and a region of no interest, and extracting a region division feature quantity including the region of interest and the region of no interest and position information on their positions;

extracting a shape of said region of interest and a shape of said region of no interest from said replacement image and said region division feature quantity, and outputting the shapes as a shape feature quantity; and calculating similarities from said extracted feature quantities and feature quantities of said group of images to be referred to.

2. The image retrieval method according to claim 1, characterized in that in the step of calculating said similarities, said images to be referred to are narrowed down using a feature quantity which enables a high-speed calculation of said similarities and which is included in said plurality of extracted feature quantities, and similarities with said query image are calculated for the narrowed-down images to be referred to from remaining feature quantities.

3. The image retrieval method according to claim 1, characterized in that in the step of calculating said similarities, a region of interest of each of said images to be referred to is extracted, a similarity between the region of interest of said query image and the region of interest extracted from each of said images to be referred to is calculated.

4. The image retrieval method according to claim 1, characterized in that in the step of calculating said similarities, a similarity with said query image is calculated using a dominant image of said group of images to be referred to which is registered in advance, the result is provided for a user, weights are assigned to said feature quantities, respectively, on a basis of said dominant image selected by the user, and a similarity between said query image and each of said images to be referred to is calculated using said feature quantities to which the weights are assigned, respectively.

5. An image retrieval method for retrieving an image which is similar to a query image which is a search key from a group of images to be referred to which is a target for retrieval, said method comprising the steps of:

dividing said query image into a region of interest and a region of no interest using inputted region-of-interest specification information on the query image, and extracting a region division feature quantity including the region of interest and the region of no interest and position information on their positions;

extracting a dominant color feature quantity showing a dominant color from said query image using said region division feature quantity;

creating a replacement image in which each pixel of said query image is replaced by a pixel of the dominant color shown by said dominant color feature quantity;

extracting a shape of said region of interest and a shape of said region of no interest from said replacement image and said region division feature quantity, and outputting the shapes as a shape feature quantity; and calculating similarities from said extracted feature quantities and feature quantities of said group of images to be referred to.

6. The image retrieval method according to claim 5, characterized in that in the step of calculating said similarities, said images to be referred to are narrowed down using a feature quantity which enables a high-speed calculation of said similarities and which is included in said plurality of extracted feature quantities, and similarities with said query image are calculated for the narrowed-down images to be referred to from remaining feature quantities.

7. The image retrieval method according to claim 5, characterized in that in the step of calculating said similarities, a region of interest of each of said images to be referred to is extracted, a similarity between the region of interest of said query image and the region of interest extracted from each of said images to be referred to is calculated.

8. The image retrieval method according to claim 5, characterized in that in the step of calculating said similarities, a similarity with said query image is calculated using a dominant image of said group of images to be referred to which is registered in advance, the result is provided for a user, weights are assigned to said feature quantities, respectively, on a basis of said dominant image selected by the user, and a similarity between said query image and each of said images to be referred to is calculated using said feature quantities to which the weights are assigned, respectively.

9. An image retrieval method for retrieving an image which is similar to a query image which is a search key from a group of images to be referred to which is a target for retrieval, said method comprising the steps of:
dividing said query image into blocks, and extracting a color layout feature quantity showing an average color of each block;
estimating a region of interest in the query image from said color layout feature quantity;
dividing said query image into the region of interest and a region of no interest in response to judgment of whether or not the estimated region of interest is suitable, and extracting a region division feature quantity including the region of interest and the region of no interest and position information on their positions;
extracting a dominant color feature quantity showing a dominant color from said query image using said region division feature quantity;
creating a replacement image in which each pixel of said query image is replaced by a pixel of the dominant color shown by said dominant color feature quantity;
extracting a shape of said region of interest and a shape of said region of no interest from said replacement image and said region division feature quantity, and outputting the shapes as a shape feature quantity; and
calculating similarities from said extracted feature quantities and feature quantities of said group of images to be referred to.

10. The image retrieval method according to claim 9, characterized in that in the step of calculating said similarities, said images to be referred to are narrowed down using a feature quantity which enables a high-speed calculation of said similarities and which is included in said plurality of extracted feature quantities, and similarities with said query image are calculated for the narrowed-down images to be referred to from remaining feature quantities.

11. The image retrieval method according to claim 9, characterized in that in the step of calculating said similarities, a region of interest of each of said images to be referred to is extracted, a similarity between the region of interest of said query image and the region of interest extracted from each of said images to be referred to is calculated.

12. The image retrieval method according to claim 9, characterized in that in the step of calculating said similarities, a similarity with said query image is calculated using a dominant image of said group of images to be referred to which is registered in advance, the result is provided for a user, weights are assigned to said feature quantities, respectively, on a basis of said dominant image selected by the user, and a similarity between said query image and each of said images to be referred to is calculated using said feature quantities to which the weights are assigned, respectively.

13. An image retrieval apparatus for retrieving an image which is similar to a query image which is a search key from a group of images to be referred to which is a target for retrieval, said apparatus comprising:
a color layout extraction unit for dividing said query image into blocks, and for extracting a color layout feature quantity showing an average color of each block;
a dominant color extraction unit for extracting a dominant color feature quantity showing a dominant color from said query image using said color layout feature quantity;
a pixel replacement unit for creating a replacement image in which each pixel of said query image is replaced by a pixel of the dominant color shown by said dominant color feature quantity;
a region dividing unit for dividing said replacement image into a region of interest and a region of no interest, and extracting a region division feature quantity including the region of interest and the region of no interest and position information on their positions;
a shape extraction unit for extracting a shape of said region of interest and a shape of said region of no interest from said replacement image and said region division feature quantity, and outputting the shapes as a shape feature quantity; and
an image similarity calculating unit for calculating similarities from said extracted feature quantities and feature quantities of said group of images to be referred to.

14. An image retrieval apparatus for retrieving an image which is similar to a query image which is a search key from a group of images to be referred to which is a target for retrieval, said apparatus comprising:
a region dividing unit for dividing said query image into a region of interest and a region of no interest using inputted region-of-interest specification information on the query image, and extracting a region division feature quantity including the region of interest and the region of no interest and position information on their positions;
a dominant color extraction unit for extracting a dominant color feature quantity showing a dominant color from said query image using said region division feature quantity;
a pixel replacement unit for creating a replacement image in which each pixel of said query image is replaced by a pixel of the dominant color shown by said dominant color feature quantity;
a shape extraction unit for extracting a shape of said region of interest and a shape of said region of no interest from said replacement image and said region division feature quantity, and outputting the shapes as a shape feature quantity; and
an image similarity calculating unit for calculating similarities from said extracted feature quantities and feature quantities of said group of images to be referred to.

15. An image retrieval apparatus for retrieving an image which is similar to a query image which is a search key from a group of images to be referred to which is a target for retrieval, said apparatus comprising:

a color layout extraction unit for dividing said query image into blocks, and extracting a color layout feature quantity showing an average color of each block;

a region-of-interest estimating unit for estimating a region of interest in the query image from said color layout feature quantity;

a region dividing unit for dividing said query image into the region of interest and a region of no interest in response to judgment of whether or not the estimated region of interest is suitable, and extracting a region division feature quantity including the region of interest and the region of no interest and position information on their positions;

a dominant color extraction unit for extracting a dominant color feature quantity showing a dominant color from said query image using said region division feature quantity;

a pixel replacement unit for creating a replacement image in which each pixel of said query image is replaced by a pixel of the dominant color shown by said dominant color feature quantity;

a shape extraction unit for extracting a shape of said region of interest and a shape of said region of no interest from said replacement image and said region division feature quantity, and outputting the shapes as a shape feature quantity; and an image similarity calculating unit for calculating similarities from said extracted feature quantities and feature quantities of said group of images to be referred to.

* * * * *